(12) United States Patent
Du

(10) Patent No.: US 10,048,752 B2
(45) Date of Patent: *Aug. 14, 2018

(54) INFORMATION PROCESSING METHOD, INFORMATION PROCESSING APPARATUS AND USER EQUIPMENT

(71) Applicant: Beijing Zhigu Rui Tuo Tech Co., Ltd, Beijing (CN)

(72) Inventor: Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 79 days.

This patent is subject to a terminal disclaimer.

(21) Appl. No.: 15/170,076

(22) Filed: Jun. 1, 2016

(65) Prior Publication Data

US 2016/0357254 A1 Dec. 8, 2016

(30) Foreign Application Priority Data

Jun. 4, 2015 (CN) .......................... 2015 1 0303051

(51) Int. Cl.
*G09G 5/00* (2006.01)
*G06F 3/01* (2006.01)
*G06K 9/00* (2006.01)

(52) U.S. Cl.
CPC ......... *G06F 3/013* (2013.01); *G06K 9/00671* (2013.01)

(58) Field of Classification Search
None
See application file for complete search history.

(56) References Cited

U.S. PATENT DOCUMENTS

| 2003/0160736 | A1 | 8/2003 | Faso et al. | |
|---|---|---|---|---|
| 2007/0014552 | A1* | 1/2007 | Ebisawa | A61B 3/113 396/51 |
| 2008/0247663 | A1 | 10/2008 | Jacobsen | |
| 2010/0315415 | A1* | 12/2010 | Asami | A63B 24/0003 345/419 |
| 2011/0169730 | A1* | 7/2011 | Sugihara | A61B 3/113 345/156 |
| 2013/0293466 | A1 | 11/2013 | Shibata | |
| 2013/0293488 | A1 | 11/2013 | Na et al. | |

(Continued)

FOREIGN PATENT DOCUMENTS

| CN | 103431840 A | 12/2013 |
|---|---|---|
| WO | 2005077258 A1 | 8/2005 |

OTHER PUBLICATIONS

Non-Final Office Action from U.S. Appl. No. 15/170,105, dated Aug. 11, 2017, 16 pages.

(Continued)

*Primary Examiner* — Martin Mushambo
(74) *Attorney, Agent, or Firm* — Amin, Turocy & Watson, LLP

(57) ABSTRACT

An information processing method, an information processing apparatus and a user equipment are provided. A method comprises: acquiring sight line information of at least one user in a space; and determining, at least according to the sight line information, at least one transparent object existing in the space. Accordingly, a transparent object in a space is determined according to sight line information of at least one user, providing a basis for transparent-object-based applications, for example, modeling the transparent object.

29 Claims, 7 Drawing Sheets

(56) References Cited

U.S. PATENT DOCUMENTS

| | | | |
|---|---|---|---|
| 2014/0043229 A1* | 2/2014 | Higaki | G06F 3/013 345/156 |
| 2015/0091794 A1 | 4/2015 | Ha | |
| 2015/0227197 A1 | 8/2015 | Nomura et al. | |
| 2016/0135675 A1 | 5/2016 | Du et al. | |
| 2016/0280136 A1 | 9/2016 | Besson | |

OTHER PUBLICATIONS

Non-Final Office Action from U.S. Appl. No. 15/170,140, dated Oct. 18, 2017, 24 pages.
Non-Final Office Action dated Apr. 5, 2018 for U.S. Appl. No. 15/910,105, 20 pages.
Non-Final Office Action dated May 10, 2018 for U.S. Appl. No. 15/170,140, 10 pages.
Notice of Allowance dated Mar. 20, 2018 for U.S. Appl. No. 15/170,140, 32 pages.

* cited by examiner

INFORMATION PROCESSING METHOD, INFORMATION PROCESSING APPARATUS AND USER EQUIPMENT

RELATED APPLICATION

The present application claims the benefit of priority to Chinese Patent Application No. 201510303051.6, filed on Jun. 4, 2015, and entitled "Information Processing Method, Information Processing Apparatus and User Equipment", which application is hereby incorporated into the present application by reference herein in its entirety.

TECHNICAL FIELD

The present application relates to the field of information processing technologies, and, for example, to an information processing method, an information processing apparatus and a user equipment.

BACKGROUND

In some application scenarios, modeling of an environment space is part of the process. For example, in an augmented reality scenario, real objects and virtual objects in the environment space are combined. During the modeling, if a transparent object is present in the environment space, the traditional automatic detection method has some problems in detecting the transparent object, for example, the transparent object can't be detected, or the transparent object is considered to be a general non-transparent object.

SUMMARY

A possible objective of example embodiments of the present application is to provide an information processing solution.

In a first aspect, an example embodiment of the present application provides an information processing method, comprising:

acquiring sight line information of at least one user in a space; and determining, at least according to the sight line information, at least one transparent object existing in the space.

In a second aspect, an example embodiment of the present application provides an information processing apparatus, comprising:

an information acquisition module, configured to acquire sight line information of at least one user in a space; and a transparent object determination module, configured to determine, at least according to the sight line information, at least one transparent object existing in the space.

In a third aspect, an example embodiment of the present application provides a user equipment, the user equipment comprising:

a memory, configured to store an instruction;

a processor, configured to execute the instruction stored in the memory, the instruction causing the processor to perform the following operations of:

acquiring sight line information of at least one user in a space; and determining, at least according to the sight line information, at least one transparent object existing in the space.

In at least one of the example embodiments of the present application, a transparent object in a space is determined according to sight line information of at least one user, providing a basis for transparent-object-based applications, for example, modeling the transparent object.

DETAILED DESCRIPTION

Figure 1:
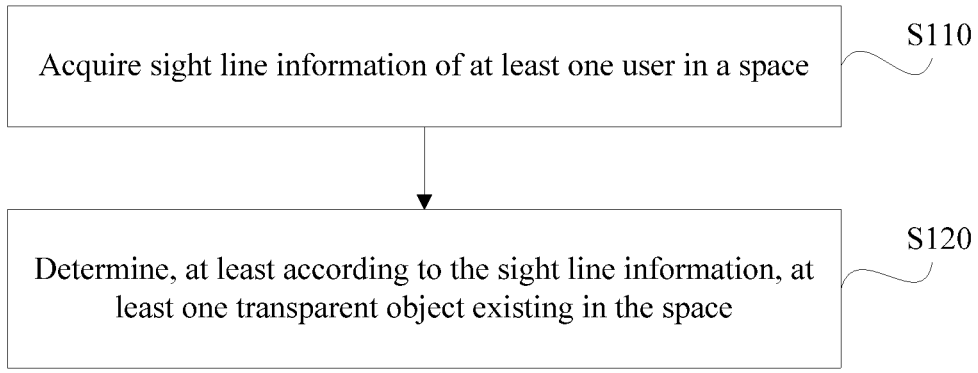
FIG. 1 is a flowchart of an information processing method according to an embodiment of the present application.

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

A transparent object in an environment space may bring about difficulties to model reconstruction of the space, for example, if the transparent object is not identified, it is considered that there is no object in the position of the transparent object, or the transparent object is identified as a non-transparent object, thus possibly causing other objects behind the transparent object to be omitted or incorrectly reconstructed. A user or a device may encounter various problems when using a model established so; therefore, as shown in FIG. 1, an embodiment of the present application provides an information processing method, comprising:

S110 acquiring sight line information of at least one user in a space; and

S120 determining, at least according to the sight line information, at least one transparent object existing in the space.

For example, an information processing apparatus provided in the present application is used as an execution body of this embodiment, to perform S110-S120. Specifically, the information processing apparatus may be disposed in a user equipment in a manner of software, hardware, or a combination of software and hardware, or the information processing apparatus itself is the user equipment; the user equipment comprises, but is not limited to: a computer, a notebook, a tablet computer, a smartphone, smart glasses, and a smart helmet.

In the above example embodiment of the present application, a transparent object in a space is determined according to sight line information of at least one user, providing a basis for transparent-object-based applications, for example, modeling the transparent object.

Each step of the embodiment of the present application is further described through the following embodiment.

S110 Acquire sight line information of at least one user in a space.

In some example embodiments, the sight line information comprises:

direction information, starting point position information and gaze point position information of multiple sight lines of the at least one user in the space.

A person skilled in the art can know that, as sight lines of the user cannot focus on the air with no objects, each sight line of the user may correspond to an object. When a user watches an object, the position of one eye of the user is a starting point position of a sight line corresponding to the eye, the position on the object watched by the user is the gaze point position of the sight line, and the direction watched by the eye is the direction of the sight line. In the embodiment of the present application, the direction of a sight line is the direction having a spatial position, for example, in the embodiment of the present application, other sight line directions parallel to but not coinciding with one sight line direction are considered to be sight line directions different from the sight line direction, or according to requirements of precision, it is feasible to set other sight line directions parallel to one sight line direction but having a distance outside a set error range, which are considered to be sight line directions different from the sight line direction.

In the embodiment of the present application, the at least one user may be one user, and may also be multiple users.

For example, in one example embodiment, optionally, the multiple sight lines may be:

multiple sight lines corresponding to objects existing in the space watched by a user multiple times in the space after one or more periods of time.

Alternatively, in one example embodiment, the multiple sight lines may be:

multiple sight lines corresponding to objects existing in the space watched by multiple users multiple times in the space after one or more periods of time.

In the embodiment of the present application, the more the number of the sight lines corresponding to the sight line information is, and the more evenly the sight lines are distributed, positions, shapes and the like of the at least one transparent object can be determined more accurately. In some example embodiments, as time goes on, the number of sight lines of the at least one user in the space may increase constantly, and thus the sight line information can be updated according to a set regularity. For example, the sight line information is updated constantly with a set cycle. In some example embodiments, an established model of the transparent object can be improved constantly through sight line information corresponding to new sight lines.

In one example embodiment, the multiple sight lines may be captured when the at least one user watches each object in the space unconsciously. Alternatively, in one example embodiment, it is also feasible to indicate the at least one user to intentionally watch the corresponding object (for example, indicate the at least one user to watch the transparent object existing in the space), thus acquiring corresponding sight line information.

In some possible application scenarios, gaze point positions of one or more sight lines of the at least one user are not on a fixed object, for example, a moving object may appear in the space, the at least one user may watch the moving object, and thus in the embodiment of the present application, in order to avoid noise brought about by noise sight lines from which such an object is watched, it is feasible to exclude the noise sight lines first.

As presence of the moving object may be random or intermittent in the time, it is feasible to determine such noise sight lines according to acquisition time information of the multiple sight lines, for example, if sight lines of a gaze point in the region only appear in a region of the space in one time period, such sight lines may be the noise sight lines. Therefore, in one example embodiment, the sight line information further comprises:

acquisition time information of the multiple sight lines.

In one example embodiment, before the determining, at least according to the sight line information, at least one transparent object, the method further comprises:

excluding, according to the acquisition time information, at least one noise sight line in the multiple sight lines.

In one example embodiment, S110 may acquire the sight line information from at least one external device. For example, in one example embodiment, it is feasible to acquire the sight line information from a data server; or, in one example embodiment, it is feasible to acquire the sight line information from at least one sight line tracking device of the at least one user and at least one locating apparatus.

The at least one sight line tracking device, for example, may be: a sight line tracking device that respectively tracks sight line directions of two eyes of a user to determine the position of a gaze point relative to the user according to the sight line directions of the two eyes. Alternatively, the sight line tracking device may also be: a sight line tracking device that tracks a sight line direction of one eye of a user and focal length information of the eye, to obtain the position of a gaze point relative to the user according to the sight line direction and the focal length information.

The at least one locating apparatus may be configured to acquire position information of the at least one user in the space, thus obtaining starting point position information corresponding to the sight line.

In one example embodiment, for example, the at least one user is one user, at this point, the information processing apparatus, for example, may be a headset device of the user, the headset device may capture sight line information of the user, and at this point, S110, for example, may be capturing the sight line information.

S120 Determine, at least according to the sight line information, at least one transparent object existing in the space.

In the following description of the embodiment of the present application, matching between a point and an object surface, for example, may be that a position difference between the point and the object surface is within a set deviation range.

When a transparent object is present in the space, in a sight line direction, the user may focus on the transparent object and may also focus on objects behind the transparent object, and thus in one example embodiment, S120 comprises:

in response to a determination that, according to the sight line information, a first gaze point and a second gaze point are distributed front and back in a sight line direction, determining that a transparent object exists in the position passing through the first gaze point in the sight line direction.

In one example embodiment, only when two sight line directions of two sight lines are both completely the same as the sight line direction, can the first gaze point and the second gaze point be considered to be distributed front and back in the sight line direction; in other example embodiments, according to different precision requirements, it is also feasible to consider that the two sight line directions are the same as the sight line direction when the difference between the two sight line directions of the two sight lines and the sight line direction is within the set range, that is, the first gaze point and the second gaze point are in the sight line direction.

In the embodiment of the present application, front and back are relative to the sight line direction, for example, an upstream position in the sight line direction is before a downstream position in the sight line direction. In the embodiment of the present application, in the sight line direction, the first gaze point is upstream of the second gaze point.

In one possible application scenario, in one sight line direction, one sight line may be in a front side of an object, and a corresponding gaze point position thereof is on the object; the other sight line may be in a back side of the object, and a corresponding gaze point position thereof is on another object behind the object. At this point, although the object may not be transparent, a first gaze point and a second gaze point distributed front and back may still be present in the sight line direction. Therefore, in the embodiment of the present application, in order to exclude such a situation and improve accuracy of determination of the transparent object, it is required that two sight line starting points of two sight lines respectively comprising the first gaze point and the second gaze point are both before the first gaze point. In this way, when an object is an ordinary object (for example, the object is neither a transparent object nor a mirror object), as the user's sight line cannot penetrate the object to reach the back side of the object, the situation may not occur where the starting point is in a front side of a gaze point in the sight line direction and the gaze point is a sight line in a rear side of the gaze point.

In one possible application scenario, when the first gaze point and the second gaze point distributed front and back are in a sight line direction, it is also likely that the object corresponding to the first gaze point is a mirror object, and at this point, in the sight line direction, the user's sight line may fall on the mirror object and may also fall on an object reflected and imaged by the mirror object. Therefore, in the embodiment of the present application, in order to exclude such a situation, the second gaze point matches an object surface. In this way, the second gaze point is a gaze point at which the object behind the first gaze point is gazed, and thus the first gaze point is a gaze point at which the transparent object is gazed.

In the example embodiment, that the second gaze point matches the object surface, for example, may be that the position difference between the second gaze point and the object surface is within a set deviation range. Herein, light may be refracted or shifted when passing through a general transparent object, the deviation range, for example, may be determined according to at least one attribute of the transparent object, where the at least one attribute, for example, may be the shape, transmissivity and the like of the transparent object.

In one example embodiment, for example, it is possible to determine, according to gaze point positions in the sight line information corresponding to the object surface, the object surface and the position thereof. In other example embodiments, it is also possible to determine the object surface and the position thereof with other automatic modeling method, for example, an image of the place of the object is acquired, and the object surface and the position thereof are obtained with an image processing method.

In one example embodiment, after it is determined that the transparent object is present in a sight line direction, the method may further comprise: determining, at least according to the sight line information, a region where the transparent object is. In this way, it is possible to provide data for modeling of the transparent object.

In one example embodiment, the determining, at least according to the sight line information, a region where the transparent object is may comprise:

obtaining, according to the sight line information, position information of all first gaze points in all sight line directions with a first gaze point and a second gaze point; and determining, according to distribution regularities of the all first gaze points and positions of the first gaze points in the sight line directions, the region where the transparent object is.

In the example embodiment, each sight line direction in the all sight line directions has a first gaze point and a second gaze point, starting points of two sight lines corresponding to the two gaze points are both before the first gaze point, and the position of the second gaze point matches an object surface.

In one example embodiment, after positions of the all first gaze points are obtained, as the all first gaze points may not be on the same transparent object, it is feasible to classify the all first gaze points according to distribution regularities of the all first gaze points, causing first gaze points from which one transparent object is gazed to be distinguished from first gaze points from which another transparent object is gazed. For example, the all first gaze points are converted to point cloud, each first gaze point is a corresponding point in the point cloud, and then points corresponding to different transparent objects are distinguished with a point cloud segmentation method. A region corresponding to a transparent object can be determined according to multiple first gaze points corresponding to the transparent object, for example, the region is obtained according to positions of the multiple first gaze points with a surface reconstruction method, for example, a Poisson surface reconstruction method. Definitely, other possible surface reconstruction methods may also be applied to the embodiment of the present application.

Through the above example embodiment, the region drawn by a first gaze point set, where a first gaze point in a sight line direction is, is the region where the transparent object corresponding to the sight line direction is.

Definitely, in other possible implementation manners, after it is determined that a first gaze point and a second gaze point are in a sight line direction, it is feasible to look for whether there are other sight line directions with a first gaze point and a second gaze point in a set range near the first gaze point. In this way, a sight line direction set may also be obtained, and the region where the transparent object corresponding to the sight line direction is may also be obtained according to the first gaze point set corresponding to the sight line direction set.

In another example embodiment, the determining, at least according to the sight line information, at least one transparent object comprises:

in response to a determination that, according to the sight line information, there is at least one set region in the space, determining that at least one transparent object existing in the at least one set region;

wherein, for each sight line direction towards a set region in the at least one set region:

there is a first gaze point and a second gaze point distributed front and back;

wherein the first gaze point is located in the set region, and the second gaze point matches an object surface behind the set region.

In the example embodiment, a transparent object is determined not through a separate sight line direction, but multiple sight line directions which are obtained by analyzing all sight lines corresponding to the sight line information. Wherein there are a first gaze point and a second gaze point existing in each sight line direction in the multiple sight line directions, at least one region is obtained according to positions of all first gaze points corresponding to the multiple sight line directions. And then the at least one region is verified, and whether, for each sight line direction towards a region in the at least one region, there is a first gaze point and a second gaze point distributed front and back as described above, if yes, the at least one region is the at least one set region, and if no, it is necessary to re-determine the at least one region, until the at least one set region is obtained.

It can be seen that, when the sight line information corresponds to more sight lines, the at least one set region may be determined more accurately.

In some example embodiments, as, when there is a first gaze point and a second gaze point distributed front and back in one sight line direction, the first gaze point may fall on a transparent object, and in addition, may also fall on a mirror object. Therefore, in some example embodiments, it is also feasible to determine that the first gaze point is on a transparent object by determining that the first gaze point is not on a mirror object. In this way, when it is impossible to determine whether a second gaze point corresponds to an object surface (for example, positions of objects behind the transparent object still cannot be determined), it is also feasible to determine whether there is a corresponding transparent object in the sight line direction. At this point, S120 comprises:

in response to a determination that, according to the sight line information, there is at least one set region in the space, determining that at least one transparent object existing in the at least one set region;

wherein, for each sight line direction towards a set region in the at least one set region:

there is a first gaze point and a second gaze point distributed front and back;

wherein the first gaze point is located in the set region, and a symmetry point which is symmetric with the second gaze point with respect to a surface of the set region doesn't match a surface of an object.

When the symmetry point matches a surface of an object, it is possible to consider that the first gaze point is on a mirror object, and when the symmetry point does not match a surface of an object, it is possible to consider that the first gaze point is on a transparent object.

In the example embodiments, it is possible to determine at least one region according to all first gaze points corresponding to all gaze directions comprised in the gaze information, wherein to each gaze direction of the all gaze directions, there are a first gaze point and a second gaze point distributed front and back and starting points of two sight lines corresponding to the first gaze point and the second gaze point are both before the first gaze point. Then verify all second gaze points according to the at least one region, to determine whether symmetry points related to the all second gaze points match at least one surface of at least one object; if no, the at least one region is the at least one set region; and if yes, it is further necessary to exclude a first gaze point corresponding to a second gaze point that a corresponding symmetry point matches a surface of an object from the all first gaze points, to re-construct at least one new region, until all the at least one region is in line with the definition of the at least one set region as above.

In the example embodiment, the position of the object surface may also be determined according to the sight line information.

In some possible application scenarios, for example, after a transparent object is determined and when positions of objects behind the transparent object cannot be determined, it is feasible to determine the positions of the objects according to the position of the second gaze point in each sight line direction corresponding to the transparent object. For example, in one example embodiment, optionally, the method may further comprise: determining, at least according to the gaze information, the position of at least one object surface behind the at least one set region.

In one example embodiment, the determining, at least according to the gaze information, the position of at least one object surface comprises:

obtaining, according to the sight line information, position information of all second gaze points in all sight line directions with a first gaze point and a second gaze point; and determining, according to distribution regularities of the all second gaze points, the position of the at least one object surface behind the at least one set region.

The embodiment of the present application is further described through the following application scenario.

Figure 2A:
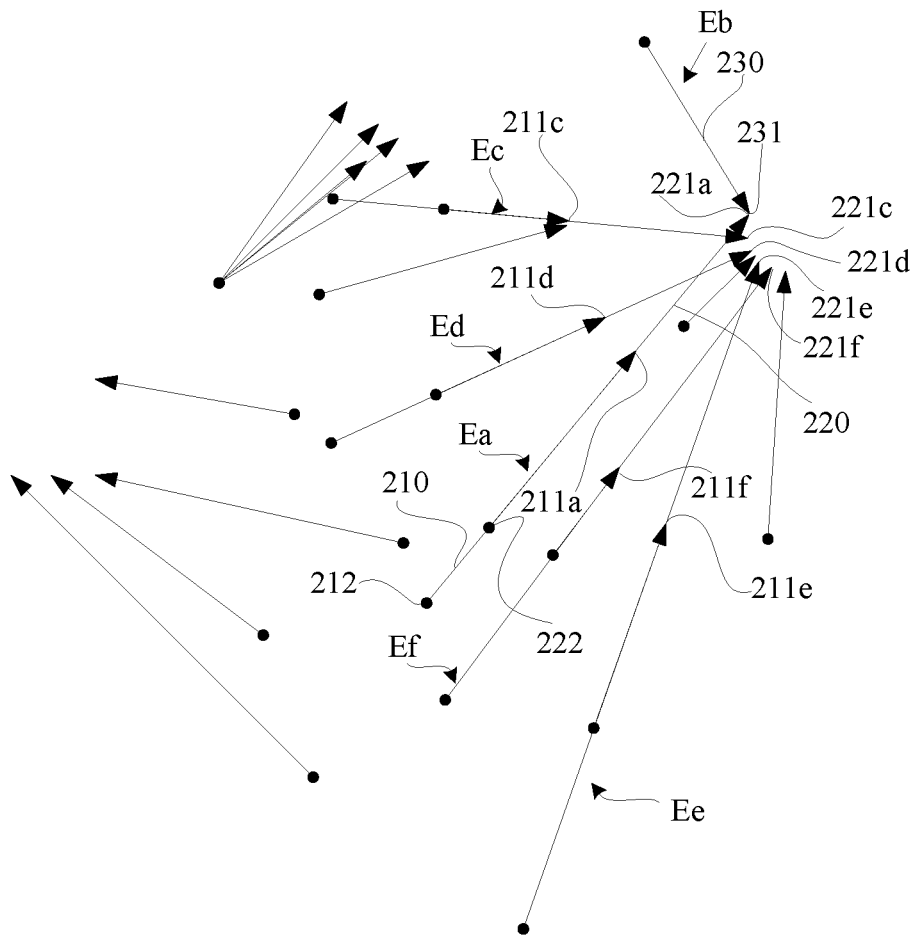
FIGS. 2a-2b are schematic diagrams of application scenarios of an information processing method according to an embodiment of the present application.

In one possible scenario, sight line information corresponding to a space comprises multiple sight lines as shown in FIG. 2a, wherein each sight line is represented with an arrowed straight line; definitely, for readability of the drawing, FIG. 2a merely exemplarily illustrates some sight lines.

In the following description of the example embodiment, for a situation where a sight line direction has two gaze points distributed front and back, the former gaze point is in the back of starting points of the two gaze points and the latter gaze point falls on an object surface, the former gaze point is referred to as first gaze point, and the latter gaze point is referred to as second gaze point. In a situation where a sight line direction has a gaze point or has multiple gaze points not satisfying the above situation, the gaze point(s) is/are referred to as third gaze point.

In the example embodiment, according to the sight line information, it is obtained that in a first sight line direction Ea, there are a first gaze point 211a and a second gaze point 221a distributed front and back along the first sight line direction Ea, wherein the first gaze point 211a is a gaze point of a first sight line 210, the second gaze point 221a is a gaze point of a second sight line 220, and a first starting point 212 of the first sight line 210 and a second starting point 222 of the second sight line are both in a front side of the first gaze point 211a.

In the example embodiment, according to the sight line information, it can be obtained that a second sight line direction Eb has a third sight line 230, and a distance difference between a third sight line point 231 of the third sight line 230 and the second gaze point 221a of the second sight line 220 is within a set deviation range, which basically coincide with each other. Herein, presence of the third sight line point 231 indicates that at the third sight line point 231 is an object surface, and thus it is feasible to consider that the second gaze point matches an object surface.

It can be seen from the above that there is a transparent object in the first sight line direction Ea, and the first gaze point 211a is on the transparent object.

Figure 2B:
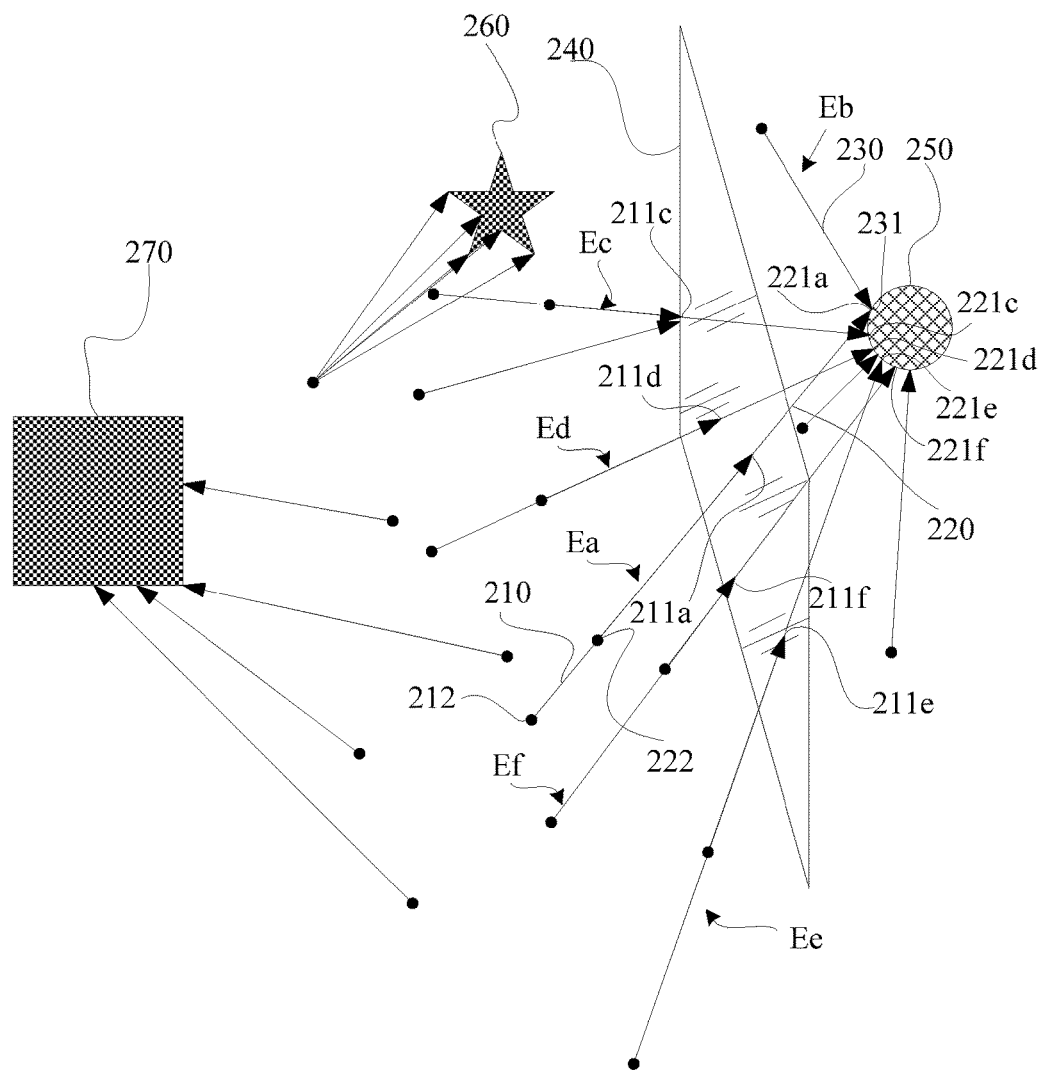

Further, in order to determine a region where the transparent object is, in the example embodiment, it is also feasible to find all sight line directions with a first gaze point and a second gaze point. In the example embodiment, as shown in FIG. 2a, several such sight line directions are further exemplarily illustrated: a third sight line direction Ec, a fourth sight line direction Ed, a fifth sight line direction Ef and a sixth sight line direction Ef, and a person skilled in the art can know that many other such sight line directions are not illustrated in FIG. 2a. According to positions of the first gaze points 211a, 211c-211f in the all sight line directions, it is feasible to determine the region where the transparent object 240 is, as shown in FIG. 2b (a person skilled in the art can know that, in order to obtain the region of the transparent object 240 in FIG. 2b, in addition to the first, third to sixth sight line directions described as above, other sight line directions with a first gaze point not illustrated are also used).

In the example embodiment, in addition to the transparent object 240, it is also feasible to determine positions of other objects according to the sight line information. For example, it is feasible to obtain, according to position information of all third gaze points in the sight line information, that a first object 250, a second object 260 and a third object 270 as shown in FIG. 2b are also present in the space. Second gaze points 221a, 221c-221f of the first, third to sixth sight lines all fall on the first object 250.

It should be understood by a person skilled in the art that, in any one of the foregoing methods of the example embodiments of the present application, the value of the serial number of each step described above does not mean an execution sequence, and the execution sequence of each step should be determined according to the function and internal logic thereof, and should not be any limitation to the implementation procedure of the specific implementations of the example embodiments of the present application.

Figure 3:
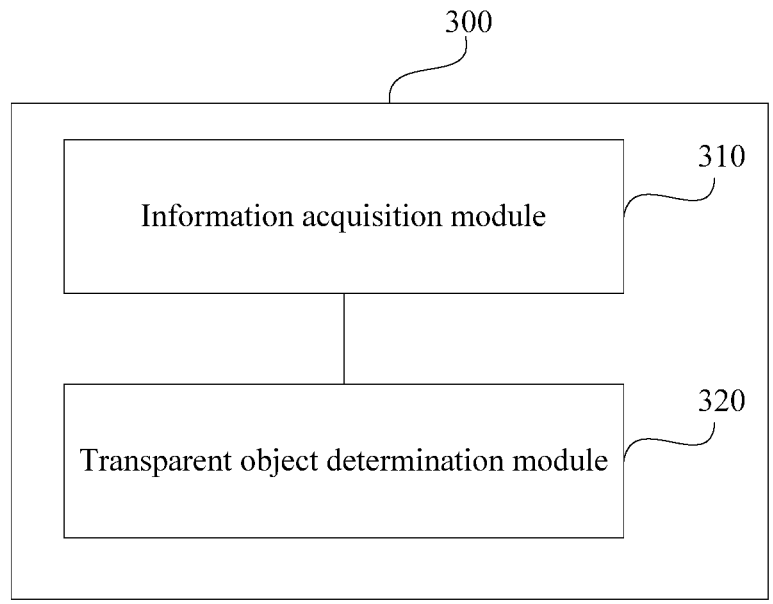
FIG. 3 is a schematic structural diagram of an information processing apparatus according to an embodiment of the present application.

As shown in FIG. 3, an embodiment of the present application provides an information processing apparatus 300, comprising:

an information acquisition module 310, configured to acquire sight line information of at least one user in a space; and a transparent object determination module 320, configured to determine, at least according to the sight line information, at least one transparent object existing in the space.

In the above example embodiment of the present application, a transparent object in a space is determined according to sight line information of at least one user, providing a basis for transparent-object-based applications, for example, modeling the transparent object.

The embodiment of the present application is further described through the following implementation manner.

In some example embodiments, the sight line information comprises:

direction information, starting point position information and gaze point position information of multiple sight lines of the at least one user in the space. Reference can be made to the corresponding description in the embodiments shown in FIG. 1 and FIGS. 2a-2b for the description about the information.

In the embodiment of the present application, the at least one user may be one user, and may also be multiple users.

For example, in one example embodiment, optionally, the multiple sight lines may be:

multiple sight lines corresponding to objects existing in the space watched by a user multiple times in the space after one or more periods of time.

Alternatively, in one example embodiment, the multiple sight lines may be:

multiple sight lines corresponding to objects existing in the space watched by multiple users multiple times in the space after one or more periods of time.

In the embodiment of the present application, the more the number of the sight lines corresponding to the sight line information is, and the more evenly the sight lines are distributed, positions, shapes and the like of the objects existing in the space can be determined more accurately. In some example embodiments, as time goes on, the number of sight lines of the at least one user in the space may increase constantly, and thus the sight line information can be updated according to a set regularity. For example, the sight line information is updated constantly with a set cycle. In some example embodiments, an established model of the transparent object can be improved constantly through sight line information corresponding to new sight lines.

In one example embodiment, the multiple sight lines may be captured when the at least one user watches each object in the space unconsciously. Alternatively, in one example embodiment, it is also feasible to indicate the at least one user to intentionally watch the corresponding object (for example, indicate the at least one user to watch the transparent object existing in the space, especially a boundary position of the transparent object), thus acquiring corresponding sight line information.

In some possible application scenarios, gaze point positions of one or more sight lines of the at least one user are not on a fixed object, for example, a moving object may appear in the space, the at least one user may watch the moving object, and thus in the embodiment of the present application, in order to avoid noise brought about by noise sight lines from which such an object is watched, it is feasible to exclude the noise sight lines first.

As presence of the moving object may be random or intermittent in the time, it is feasible to determine such noise sight lines according to acquisition time information of the multiple sight lines, for example, if sight lines of a gaze point in the region only appear in a region of the space in one time period, such sight lines may be the noise sight lines. Therefore, in one example embodiment, the sight line information further comprises:

acquisition time information of the multiple sight lines.

Figure 4A:
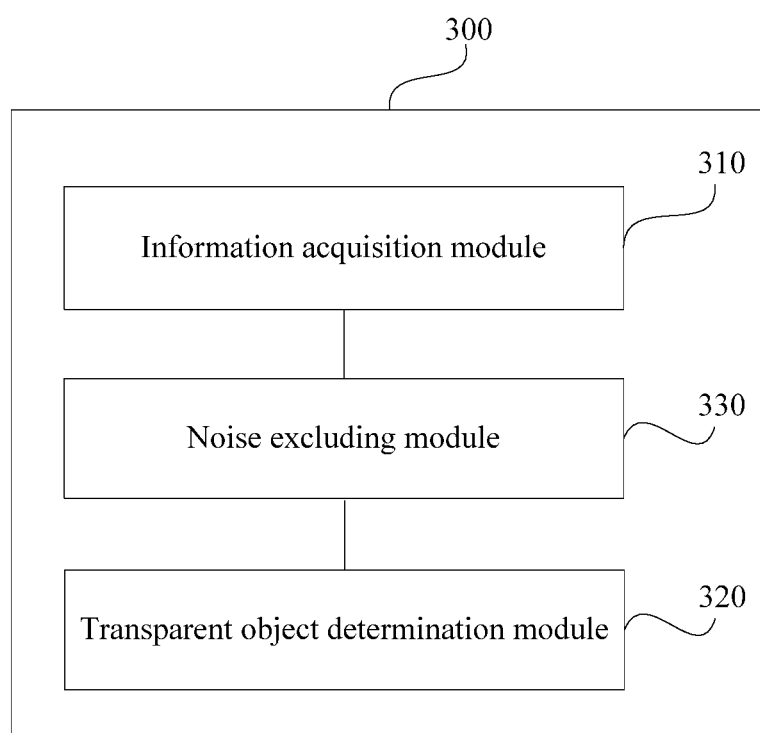
FIGS. 4a-4d are schematic structural diagrams of four information processing apparatuses according to an embodiment of the present application.

As shown in FIG. 4a, in the example embodiment, the apparatus 300 further comprises:

a noise excluding module 330, configured to exclude, according to the acquisition time information, at least one noise sight line in the multiple sight lines.

The at least one noise sight line comprises: at least one sight line from which a moving object is watched.

In one example embodiment, the information acquisition module 310 may comprise multiple sensors, configured to capture the sight line information. The sensors, for example, may comprise a locator that locates the position of at least one user in a space, and a sight line tracking device that captures sight line directions of the at least one user and positions of gaze points relative to the user.

In another example embodiment, the information acquisition module 310 may comprise a communication device, configured to acquire the sight line information from at least one external device. The at least one external device, for example, may comprise a device that comprises the above multiple sensor, or may be at least one data server that collects the sight line information.

Figure 4B:
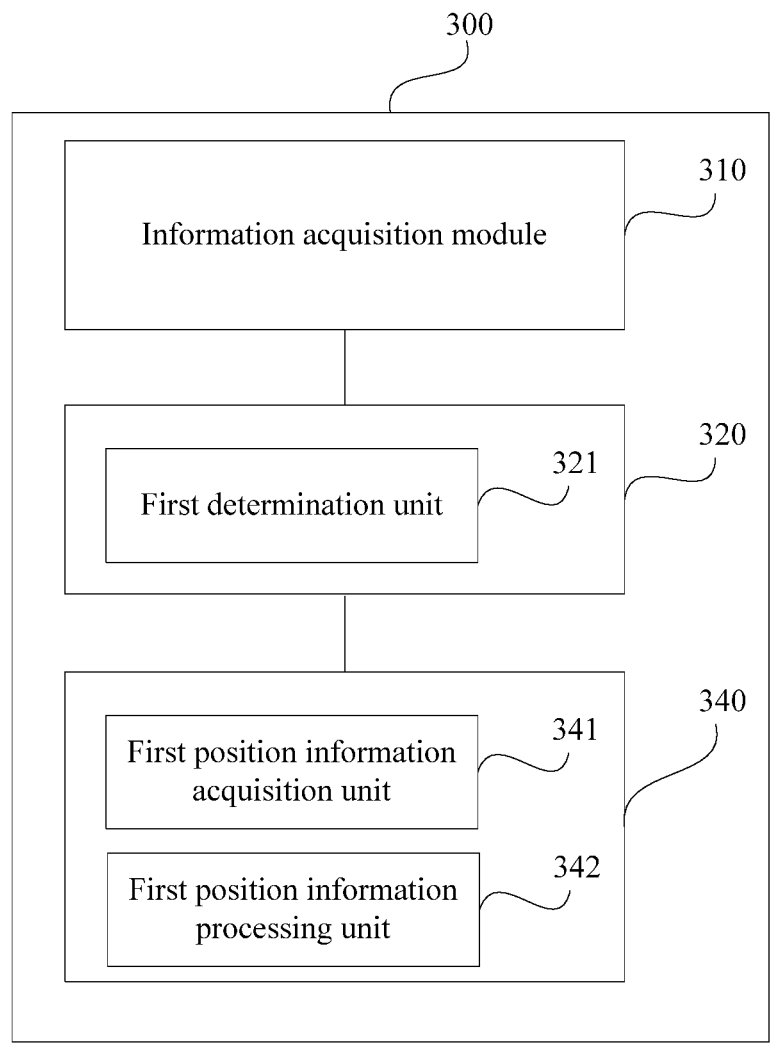

As shown in FIG. 4b, in one example embodiment, the transparent object determination module 320 comprises:

a first determination unit 321, configured to, in response to a determination that, according to the sight line information, a first gaze point and a second gaze point are distributed front and back in a sight line direction, determine that a transparent object exists in the position passing through the first gaze point in the sight line direction;

wherein two sight line starting points of two sight lines respectively comprising the first gaze point and the second gaze point are both before the first gaze point, and the second gaze point matches an object surface.

In one example embodiment, only when two sight line directions of two sight lines are both completely the same as the sight line direction, can the first gaze point and the second gaze point be considered to be distributed front and back in the sight line direction; in other example embodiments, according to different precision requirements, it is also feasible to consider that the two sight line directions are the same as the sight line direction when the difference between the two sight line directions of the two sight lines and the sight line direction is within the set range, that is, the first gaze point and the second gaze point are in the sight line direction.

In the embodiment of the present application, front and back are relative to the sight line direction.

In the example embodiment, that the second gaze point matches the object surface, for example, may be that the position difference between the second gaze point and the object surface is within a set deviation range.

In one example embodiment, after it is determined that the transparent object is present in a sight line direction, it may be further necessary to determine a region where the transparent object is, which, for example, provides data for modeling of the transparent object. Therefore, in the example embodiment, the apparatus 300 further comprises:

a region determination module 340, configured to determine, at least according to the sight line information, a region where the transparent object is.

In one example embodiment, optionally, the region determination module 340 may comprise:

a first position information acquisition unit 341, configured to obtain, according to the sight line information, position information of all first gaze points in all sight line directions with a first gaze point and a second gaze point. In the implementation manner, each sight line direction in the all sight line directions has a first gaze point and a second gaze point, starting points of two sight lines corresponding to the two gaze points are both before the first gaze point, and the position of the second gaze point matches an object surface.

a first position information processing unit 342, configured to determine, according to distribution regularities of the all first gaze points and positions of the first gaze points in the sight line directions, the region where the transparent object is.

In one example embodiment, after the position of the first gaze point is obtained, as it is likely that the all first gaze points are not all on the same transparent object, it is feasible to classify the all first gaze points according to distribution regularities of the all first gaze points, causing the first gaze points from which one transparent object is gazed to be distinguished from the first gaze points from which another transparent object is gazed.

Through the above example embodiment, it can be seen that the region drawn by a first gaze point set where a first gaze point in a sight line direction are is the region where the transparent object corresponding to the sight line direction is.

Further, in other example embodiments, after it is determined that a first gaze point and a second gaze point are in a sight line direction, it is feasible to look for whether there are other sight line directions with a first gaze point and a second gaze point in a set range near the first gaze point. In this way, a sight line direction set may also be obtained, and the region where the transparent object corresponding to the sight line direction is may also be obtained according to the first gaze point set corresponding to the sight line direction set.

Figure 4C:
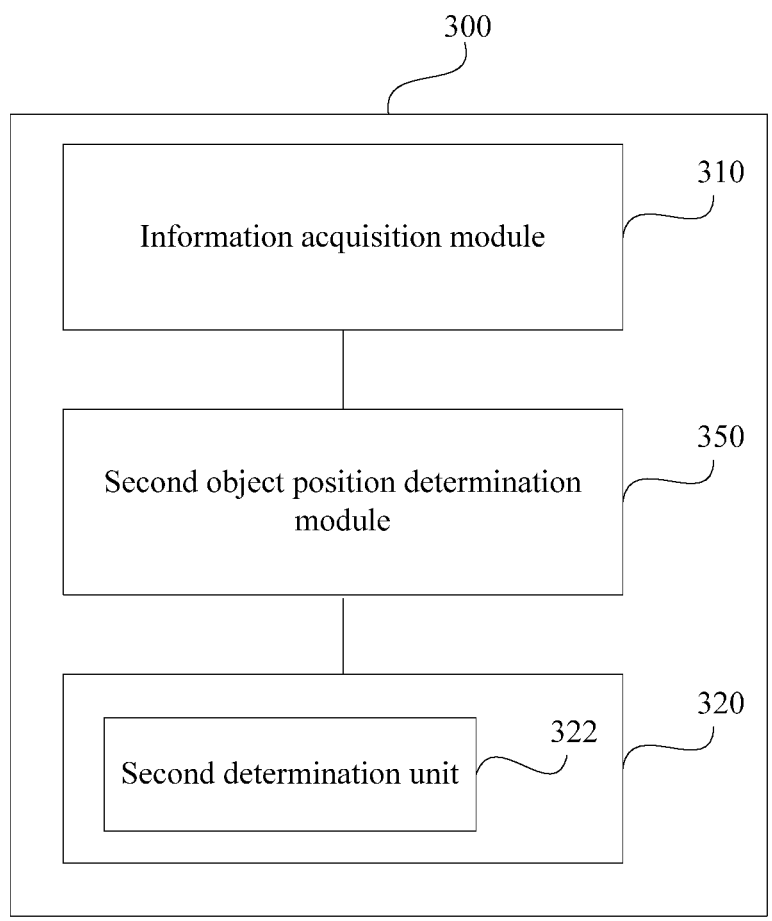

In another example embodiment, as shown in FIG. 4c, the transparent object determination module 320 may comprise:

a second determination unit 322, configured to, in response to a determination that, according to the sight line information, there is at least one set region in the space, determine that at least one transparent object existing in the at least one set region;

wherein, for each sight line direction towards a set region in the at least one set region:

there is a first gaze point and a second gaze point distributed front and back;

wherein the first gaze point is located in the set region, and the second gaze point matches an object surface behind the set region.

Reference can be made to the corresponding description in the embodiment shown in FIG. 1 for further description about the implementation of the function of the second determination unit 322.

In the solution of the first determination unit 321 and the second determination unit 322, it is necessary to know object surface position information behind the transparent object. In one example embodiment, as shown in FIG. 4c, the apparatus 300 further comprises:

a second object position determination module 350, configured to determine, according to the sight line information, the position of the object surface. For example, in the implementation manners shown in FIGS. 2a-2b, the position of the object surface is obtained through respective third gaze points.

Figure 4D:
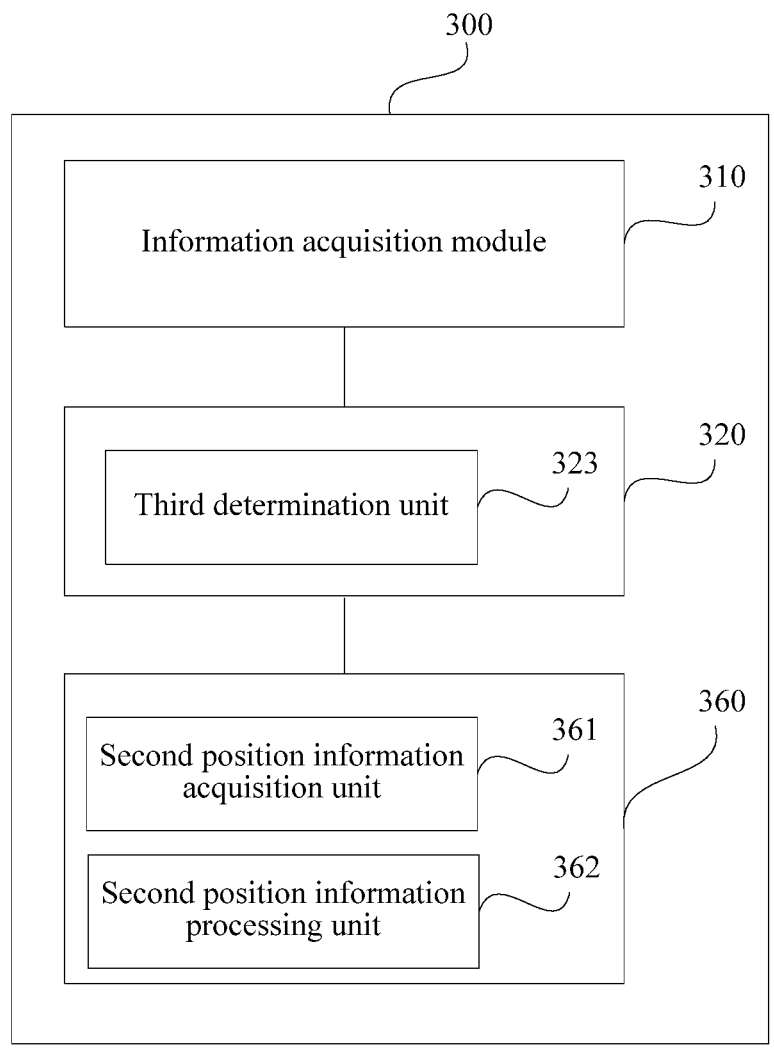

In some example embodiments, as, when there is a first gaze point and a second gaze point distributed front and back in one sight line direction, the first gaze point may fall on a transparent object, and in addition, may also fall on a mirror object. Therefore, in some possible implementation manners, it is also feasible to determine that the first gaze point is on a transparent object by determining that the first gaze point is not on a mirror object. In this way, when it is impossible to determine whether a second gaze point corresponds to an object surface (for example, positions of objects behind the transparent object still cannot be determined), it is also feasible to determine whether there is a corresponding transparent object in the sight line direction. Therefore, in one example embodiment, as shown in FIG. 4d, the transparent object determination module 320 may comprise:

a third determination unit 323, configured to, in response to a determination that, according to the sight line information, there is at least one set region in the space, determine that at least one transparent object existing in the at least one set region;

wherein, for each sight line direction towards a set region in the at least one set region:

there is a first gaze point and a second gaze point distributed front and back;

wherein the first gaze point is located in the set region, and a symmetry point which is symmetric with the second gaze point with respect to a surface of the set region doesn't match a surface of an object.

When the symmetry point matches a surface of an object, it is feasible to consider that the first gaze point is on a mirror object, because the second gaze point corresponds to a mirror image of the surface of the object in the mirror object; and when the symmetry point does not match a surface of an object, it is feasible to consider that the first gaze point is on a transparent object.

Reference can be made to the corresponding description in the embodiment shown in FIG. 1 for further description of the implementation of the function of the third determination unit 323.

In some possible application scenarios, for example, after a transparent object is determined and when positions of objects behind the transparent object cannot be determined, it is feasible to determine the positions of the objects according to the position of the second gaze point in reach sight line direction corresponding to the transparent object. Therefore, in one example embodiment, optionally, as shown in FIG. 4d, the apparatus 300 further comprises:

a first object position determination module 360, configured to determine, at least according to the gaze information, the position of at least one object surface behind the at least one set region.

In one example embodiment, the first object position determination module 360 comprises:

a second position information acquisition unit 361, configured to obtain, according to the sight line information, position information of all second gaze points in all sight line directions with a first gaze point and a second gaze point; and a second position information processing unit 362, configured to determine, according to distribution regularities of the all second gaze points, the position of the at least one object surface behind the at least one set region.

Reference can be made to the corresponding description in the above method embodiment for the further description about the implementation of the functions of the modules and units in the embodiment of the present application.

Figure 5:
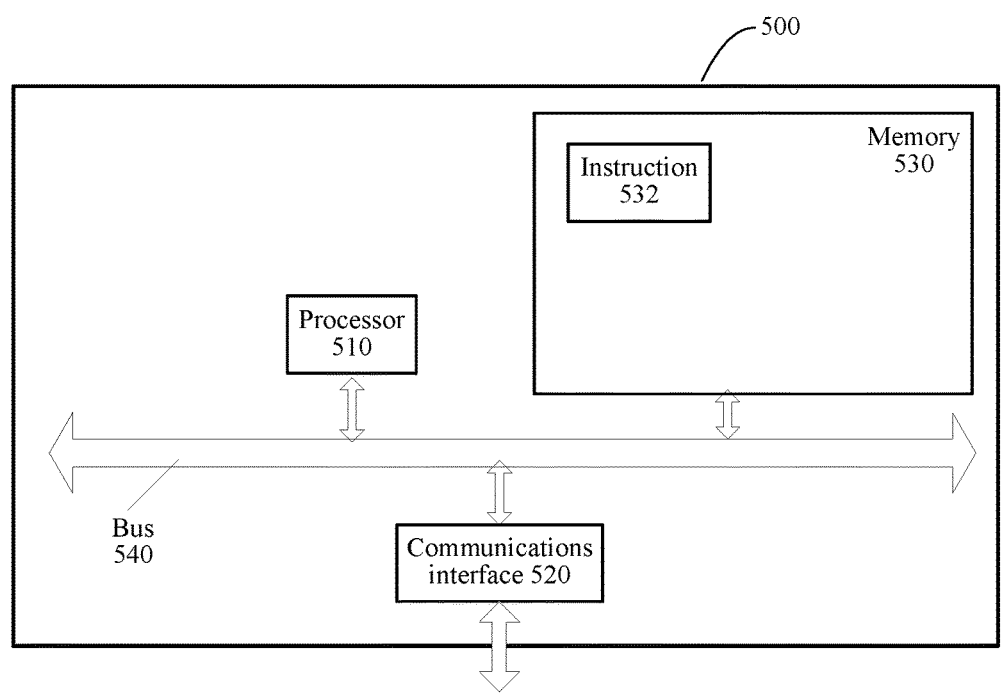
FIG. 5 is a schematic structural diagram of a user equipment according to an embodiment of the present application.

FIG. 5 is a schematic structural diagram of a user equipment 500 according to an embodiment of the present application; the example embodiments of the present application do not limit specific implementation of the user equipment 500. As shown in FIG. 5, the user equipment 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute an instruction 532, and specifically, may implement relevant steps in the above method embodiments.

Specifically, the instruction 532 may comprise a computer operation instruction.

The processor 510 may be a central processing unit (CPU), or an application specific integrated circuit (ASIC), or one or more integrated circuits configured to implement the embodiments of the present application.

The memory 530 is configured to store the instruction 532. The memory 530 may comprise a high-speed random access memory (RAM), or may also comprise a non-volatile memory, for example, at least one magnetic disk memory. The instruction 532 may be specifically configured to enable the user equipment 500 to perform the following steps:

acquiring sight line information of at least one user in a space; and determining, at least according to the sight line information, at least one transparent object existing in the space.

For implementation of the steps in the instruction 532, reference may be made to corresponding description in the corresponding steps and units in the embodiments, and no further details are provided herein again. A person skilled in the art may clearly know that, for the purpose of convenient and brief description, for a detailed working process of the foregoing device and modules, reference may be made to a corresponding process in the foregoing method embodiments, and no further details are provided herein again.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of the present application. The foregoing storage medium comprises: any medium that can store program code, such as a USB flash drive, a removable hard disk, a read-only memory (ROM, Read-Only Memory), a RAM, a magnetic disk, or an optical disc.

The foregoing example embodiments are merely used for describing the present application, rather than limiting the present application. A person of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A method, comprising:

tracking, by a system comprising a processor via at least one sight line tracking device, at least sight lines of at least one eye of at least one user in a space;

acquiring, by the system, sight line information of the at least one user in the space based on the tracking, wherein the sight line information comprises direction information, starting point information, and gaze point position information of the sight lines; and determining, at least according to the sight line information, at least one transparent object existing in the space.

2. The method of claim 1, wherein the determining, at least according to the sight line information, the at least one transparent object existing in the space comprises:
in response to a determination that, according to the sight line information, a first gaze point and a second gaze point are distributed front and back in a sight line direction, determining that a transparent object of the at least one transparent object exists in a position passing through the first gaze point in the sight line direction, and
wherein two sight line starting points of two sight lines respectively comprising the first gaze point and the second gaze point are before the first gaze point, and
wherein the second gaze point matches a surface of an object.

3. The method of claim 2, further comprising:
determining, at least according to the sight line information, a region where the transparent object is located.

4. The method of claim 3, wherein the determining, at least according to the sight line information, the region where the transparent object is comprises:
obtaining, according to the sight line information, position information of all gaze points in all sight line directions with the first gaze point and the second gaze point; and
determining, according to distribution regularities of all the gaze points and positions of all the gaze points in all the sight line directions, the region where the transparent object is located.

5. The method of claim 2, wherein the position passing through the first gaze point in the sight line direction is a first position, and further comprising:
determining, according to the sight line information, a second position of the surface of the object.

6. The method of claim 1, wherein the determining, at least according to the sight line information, the at least one transparent object comprises:
in response to a determination that, according to the sight line information, there is at least one set region in the space, determining that the at least one transparent object exists in the at least one set region,
wherein, for each sight line direction towards a set region in the at least one set region, a first gaze point and a second gaze point are distributed front and back,
wherein the first gaze point is located in the set region, and
wherein the second gaze point matches a surface of an object behind the set region.

7. The method of claim 1, wherein the determining, at least according to the sight line information, the at least one transparent object comprises:
in response to a determination that, according to the sight line information, there is at least one set region in the space, determining that the at least one transparent object exists in the at least one set region;
wherein, for each sight line direction towards a set region in the at least one set region, a first gaze point and a second gaze point are distributed front and back,
wherein the first gaze point is located in the set region, and
wherein a symmetry point, which is symmetric with the second gaze point with respect to a surface of the set region, does not match a surface of an object.

8. The method of claim 7, further comprising:
determining, at least according to gaze information of the at least one user, at least one position of at least one surface of at least one object behind the at least one set region.

9. The method of claim 8, wherein the determining, at least according to the gaze information, the at least one position of the at least one surface of the at least one object comprises:
obtaining, according to the sight line information, position information of all gaze points in all sight line directions with the first gaze point and the second gaze point; and
determining, according to distribution regularities of all the gaze points, the at least one position of the at least one surface of the at least one object behind the at least one set region.

10. The method of claim 1, wherein the at least one user comprises multiple users.

11. The method of claim 1, wherein the sight line information further comprises:
acquisition time information of the sight lines.

12. The method of claim 11, wherein, before the determining, at least according to the sight line information, the at least one transparent object, further comprising:
excluding, according to the acquisition time information, at least one noise sight line in the sight lines.

13. The method of claim 12, wherein the at least one noise sight line comprises: at least one sight line from where a moving object is watched.

14. An apparatus, comprising:
a memory that stores executable modules; and
a processor, coupled to the memory, that executes or facilitates execution of the executable modules, the executable modules comprising:
an information acquisition module configured to:
track, via at least one sight line tracking device, at least sight lines of at least one eye of a user in a space, and
acquire sight line information of the user in the space based on the tracking, wherein the sight line information comprises direction information, starting point information, and gaze point position information of the sight lines; and
a transparent object determination module configured to determine, at least according to the sight line information, a transparent object existing in the space.

15. The apparatus of claim 14, wherein the transparent object determination module comprises:
a determination unit configured to, in response to a determination that, according to the sight line information, a first gaze point and a second gaze point are distributed front and back in a sight line direction, determine that the transparent object exists in a position passing through the first gaze point in the sight line direction,
wherein two sight line starting points of two sight lines respectively comprising the first gaze point and the second gaze point are before the first gaze point, and
wherein the second gaze point matches a surface of an object.

16. The apparatus of claim 15, wherein the executable modules further comprise:
a region determination module configured to determine, at least according to the sight line information, a region where the transparent object is located.

17. The apparatus of claim 16, wherein the region determination module comprises:

a position information acquisition unit configured to obtain, according to the sight line information, position information of gaze points in sight line directions with the first gaze point and the second gaze point; and a position information processing unit configured to determine, according to distribution regularities of the gaze points and positions of the gaze points in the sight line directions, the region where the transparent object is located.

18. The apparatus of claim 15, wherein the executable modules further comprise:

an object position determination module configured to determine, according to the sight line information, a position of the surface of the object.

19. The apparatus of claim 14, wherein the transparent object determination module comprises:

a determination unit configured to, in response to a determination that, according to the sight line information, there is a set region in the space, determine that the transparent object exists in the set region;

wherein, for each sight line direction towards the set region, there is a first gaze point and a second gaze point distributed front and back, wherein the first gaze point is located in the set region, and wherein the second gaze point matches a surface of an object behind the set region.

20. The apparatus of claim 14, wherein the transparent object determination module comprises:

a determination unit configured to, in response to a determination that, according to the sight line information, there is a set region in the space, determine that the transparent object existing in the set region;

wherein, for each sight line direction towards a set region in the set region: there is a first gaze point and a second gaze point distributed front and back;

wherein the first gaze point is located in the set region, and a symmetry point which is symmetric with the second gaze point with respect to a surface of the set region doesn't match a surface of an object.

21. The apparatus of claim 20, wherein the executable modules further comprise:

an object position determination module configured to determine, at least according to the gaze information, the position of a surface of an object behind the set region.

22. The apparatus of claim 21, wherein the first object position determination module comprises:

a position information acquisition unit configured to obtain, according to the sight line information, position information of all second gaze points in all sight line directions with a first gaze point and a second gaze point; and a position information processing unit configured to determine, according to distribution regularities of the all second gaze points, the position of the surface of the object behind the set region.

23. The apparatus of claim 14, wherein the sight line information is from multiple users, comprising the user, in the space.

24. The apparatus of claim 14, wherein the sight line information further comprises:

acquisition time information of the sight lines.

25. The apparatus of claim 24, wherein the executable modules further comprise:

a noise excluding module configured to exclude, according to the acquisition time information, a noise sight line in the sight lines.

26. The apparatus of claim 25, wherein the noise sight line comprises: a sight line from which a moving object is being watched.

27. A user equipment, comprising:

a memory configured to store at least one instruction;

a processor configured to execute the instruction stored in the memory, the at least one instruction causing the processor to perform operations, comprising:

tracking, via at least one sight line tracking device, at least sight line directions of at least one eye of at least one user in a space;

acquiring sight line information of the at least one user in the space based on the tracking, wherein the sight line information comprises direction information, starting point information, and gaze point position information of the sight lines; and at least based on the sight line information determining at least one transparent object existing in the space.

28. The user equipment of claim 27, wherein the determining, at least according to the sight line information, the at least one transparent object existing in the space comprises:

in response to a determination that, according to the sight line information, a first gaze point and a second gaze point are distributed front and back in a sight line direction, determining that a transparent object of the at least one transparent object exists in a position passing through the first gaze point in the sight line direction, and wherein two sight line starting points of two sight lines respectively comprising the first gaze point and the second gaze point are before the first gaze point, and wherein the second gaze point matches a surface of an object.

29. The user equipment of claim 28, the operations further comprising:

determining, at least according to the sight line information, a region where the transparent object is located.

* * * * *